(12) United States Patent
Alexandrescu

(10) Patent No.: US 7,664,759 B2
(45) Date of Patent: Feb. 16, 2010

(54) METHOD AND SYSTEM FOR STORING SELF-DESCRIPTIVE TABULAR DATA WITH ALPHANUMERIC AND BINARY VALUES

(75) Inventor: Maxim A. Alexandrescu, Toronto (CA)

(73) Assignee: Hewlett-Packard Development Company, L.P., Houston, TX (US)

(*) Notice: Subject to any disclaimer, the term of this patent is extended or adjusted under 35 U.S.C. 154(b) by 499 days.

(21) Appl. No.: 10/847,759

(22) Filed: May 18, 2004

(65) Prior Publication Data

US 2005/0262109 A1    Nov. 24, 2005

(51) Int. Cl.
G06F 17/30    (2006.01)
(52) U.S. Cl. .................... 707/100; 707/102; 707/103 R; 707/104.1
(58) Field of Classification Search ................ 715/513; 707/10, 101, 100, 3, 1, 103 R, 104.1, 102
See application file for complete search history.

(56) References Cited

U.S. PATENT DOCUMENTS

| | | | | | |
|---|---|---|---|---|---|
| 5,165,103 | A | * | 11/1992 | Takeda et al. ............... | 382/305 |
| 5,799,308 | A | * | 8/1998 | Dixon ......................... | 707/100 |
| 5,904,562 | A | * | 5/1999 | Nulman ....................... | 438/654 |
| 6,209,124 | B1 | * | 3/2001 | Vermeire et al. ............ | 717/114 |
| 6,728,728 | B2 | * | 4/2004 | Spiegler et al. ......... | 707/103 R |
| 6,904,562 | B1 | * | 6/2005 | Hind et al. .................. | 715/515 |
| 2002/0184263 | A1 | | 12/2002 | Perinet et al. ............... | 707/513 |
| 2003/0046317 | A1 | * | 3/2003 | Cseri et al. .................. | 707/513 |
| 2003/0126145 | A1 | * | 7/2003 | Sundstrom et al. .......... | 707/100 |
| 2004/0028049 | A1 | * | 2/2004 | Wan ............................ | 370/394 |

FOREIGN PATENT DOCUMENTS

| EP | 1 300 775 A1 | 4/2003 |
|---|---|---|
| EP | 1300775 A1 * | 4/2003 |
| WO | WO 02/48920 A2 | 6/2002 |

OTHER PUBLICATIONS

Ammara, Images-Access image storage, Feb. 11, 2004, p. 1.*
PCT International Search Report, PCT/US2005/013654, Aug. 31, 2005, pp. 1-4.
Programming Ruby II, "Comma Separated Variables," May 18, 2004, pp. 1.
PCT/US2005/013654, International Preliminary Report on Patentability and Written Opinion, Nov. 30, 2006, pp. 1-7.

* cited by examiner

Primary Examiner—John R. Cottingham
Assistant Examiner—Sherief Badawi

(57) ABSTRACT

A method and system for storing and retrieving alphanumeric (83) and binary data values (78) includes storing in a tabular data archive (60) an open tabular format XML file (62) containing a plurality of alphanumeric data values (83) and meta-information (84). Meta-information (84 and 80) describes a predetermined set of characteristics of the alphanumeric data values (83) and binary data values (78). The method and system store in the tabular data archive (60) a plurality of individual binary files (64) each comprising exactly one binary data value (163, 164, 165, 166) and further describe the binary files (64) using the predetermined set of characteristics (80). The method further includes storing in the open tabular format XML file (62) a plurality of references (90) to the individual binary files (64). Thereafter, the open tabular format XML file (62) may be parsed for selectably retrieving at least one predetermined subset of the plurality of alphanumeric data values (83) and of the plurality of binary data values stored in individual binary files (64).

14 Claims, 6 Drawing Sheets

METHOD AND SYSTEM FOR STORING SELF-DESCRIPTIVE TABULAR DATA WITH ALPHANUMERIC AND BINARY VALUES

FIELD OF THE INVENTION

This invention pertains to data management and storage systems and methods of operation and, more particularly, to a method and system for storing and retrieving self-descriptive tabular data having both alphanumeric and binary values.

BACKGROUND OF THE INVENTION

In the operation of computer software applications, oftentimes a need arises to store and share tabular data. For present purposes, tabular data includes collections of data values organized in rows and columns. Each element or table cell of such a collection represents an individual data value and is formed using a sequence of bytes. Such data values may be alphanumeric (i.e., text), in which case the contents of the bytes making up the value are limited to a subset of the possible values that bytes may store. Alternatively, such data values may be binary (image, sound, program etc), in which case the bytes of the value may store any possible value. Conventionally, however, it is not possible to store both alphanumeric data values and binary data values in the same tabular data collection.

One of the reasons for tabular data collections to not include both alphanumeric data values and binary data values relates to the need of computer software applications using such tabular data to parse such a hybrid collection. Parsing the tabular data collection, usually a sequential process involving analyzing or separating the data into more easily processed components, permits precise data values retrieval.

In addition, the physical format storing tabular data must support random access to the data. Unfortunately, stored binary data may be quite voluminous, making the act of parsing all stored binary data difficult and tedious. Moreover, for many uses of binary data, no need exists to parse all of the data for its retrieval. For many binary data values sequentially accessing the data may result in high retrieval times, especially when the tabular data collection includes large binary values. At the same time, inconsistent retrieval times may arise, depending on the position of the value in the collection.

There is no known data format that supports all these requirements. A format known as the "comma separated values" or CSV format attempts to support rapid sequential parsing of tabular data format. Unfortunately, such a format is more suitable to store only alphanumeric data and fails to permit easily the parsing of binary data together with alphanumeric data. Furthermore, the CSV format requires sequential data access and does not provide for meta-information storage or use.

Accordingly, there is the need for a method and system that permits the flexible storage and unequivocal retrieval of both binary and alphanumeric data, which also supports random access to the binary data.

There is a need for a self-descriptive data format that supports the storage of information about the data together with the data itself. Such a format may reduce the level of dependency of particular software applications residing in associated computing platform or network for using such data.

Still further a need exists for a method and system for communicating both alphanumeric and binary data together with associated meta-information, in an open and flexible single package or format that changes according to the dynamics of particular use situation or programming environment.

Finally, in order to transfer such a tabular collection of alphanumeric and binary data values together with its meta-information between computer software applications (potentially over computer networks), the physical storage of all data and meta-information has to be a standalone structure.

BRIEF DESCRIPTION OF THE DRAWINGS

For a more complete understanding of the present method and system for storing and retrieving self-descriptive tabular data having both alphanumeric and binary values, reference is now made to the following description which is to be taken in conjunction with the accompanying drawings and in which like reference numbers indicate like features and further wherein.

DETAILED DESCRIPTION OF THE ILLUSTRATIVE EMBODIMENTS

Figure 1:
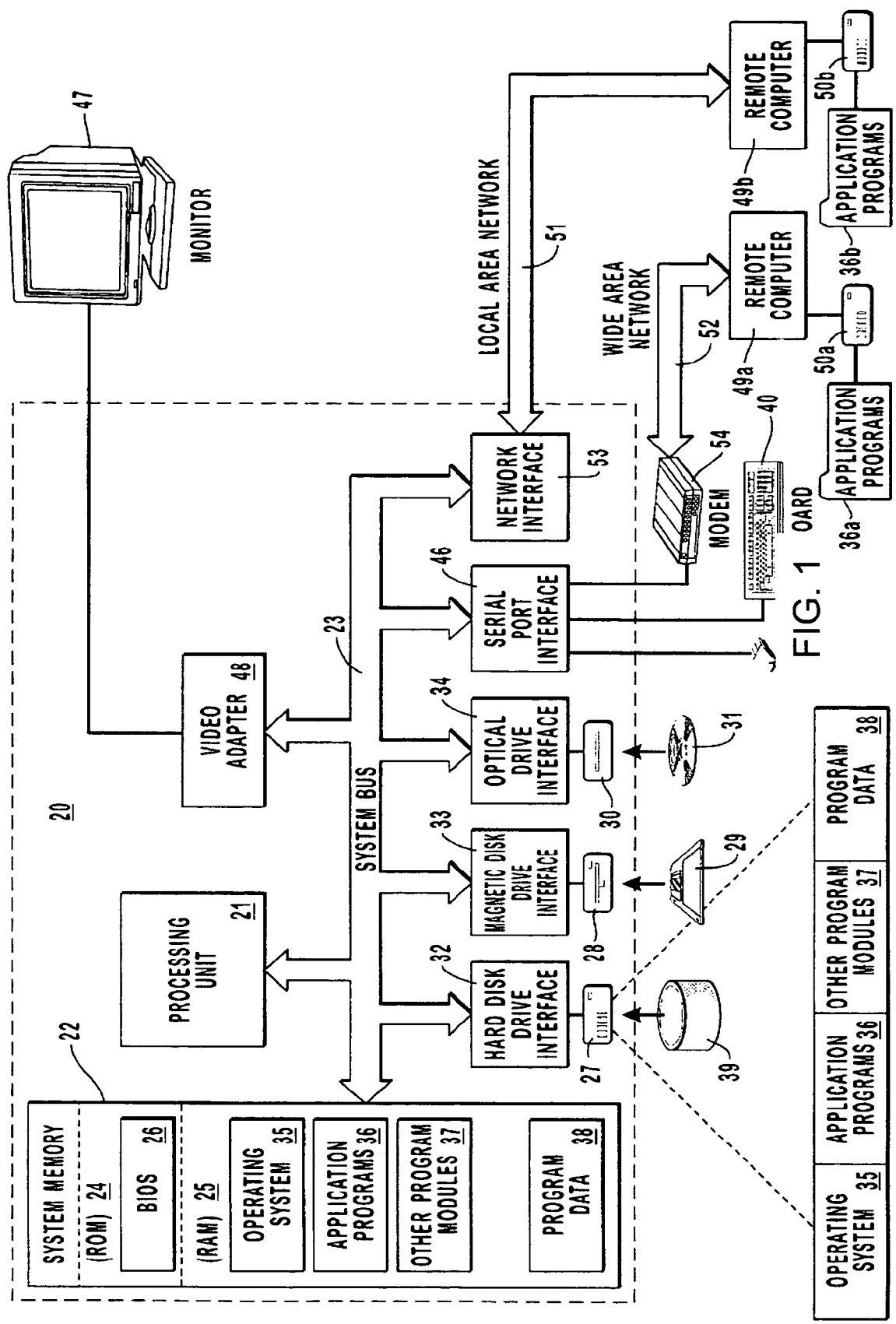
FIG. 1 illustrates an exemplary system that provides a suitable operating environment for the present invention.

Preferred embodiments of this invention are described herein, including the best mode known to the inventor for carrying out the invention. Variations of those preferred embodiments may become apparent to those of ordinary skill in the art upon reading the following description. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

The inventor expects skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

According to one aspect of the invention, there is provided a method for storing and retrieving self-descriptive tabular data with alphanumeric and binary values. The invention includes the steps of and instructions for storing in an open tabular format a plurality of alphanumeric data values and associated meta-information. The meta-information provides the means to store any data-related information a particular software application might require. The method and system store in the open tabular format a plurality of individual binary files comprising a plurality of binary values and further describe the binary files using the predetermined set of characteristics. The method and system furthermore involve storing in the open tabular format a plurality of references to the individual binary files, allowing random access to these binary files.

The present invention incorporates a file, having the format of an instance definition of the Extensible Markup Language (XML) and containing a plurality of alphanumeric values and meta-information. The present invention combines this file with a plurality of binary files into a single data bundle that may be easily communicated to a computer software application. Using XML offers the advantage of a simple, human-readable format, with broad industry-acceptance. In addition, numerous parsing software packages exist which may parse the XML statements. Accordingly, the benefits of a tabular data bundle formed according to the teachings of the present invention may be realized in a wide variety of ways.

While the schema or format of the file used to encompass the alphanumeric data and the meta-information is described herein in terms of XML, it is understood that other file schemas or formats, such as Standard Generalized Markup Language (SGML) or the like or any combination thereof may be used as described herein.

The present invention extends to methods, systems, and data structures for encompassing scripts in a single file and for identifying and executing scripts. The embodiments of the present invention may comprise one or more special purpose or general purpose computers including various computer hardware devices, as discussed in greater detail below. As used herein, a "memory," "recording medium," and "data store" may be any means that contains, stores, communicates, propagates, or transports the program and/or data for use by or in conjunction with an instruction execution system, apparatus or device. For example, memory, recording medium and data store may be, but are not limited to, an electronic, magnetic, optical, electromagnetic, infrared or semiconductor system, apparatus or device. Memory, recording medium and data store may also include, but are not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that several of the acts and operation described hereinafter may also be implemented in hardware.

Embodiments within the scope of the present invention also include computer-readable media for carrying or having computer-executable instructions or data structures stored thereon. Such computer-readable media may be any available media which may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following associated description intend to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc., that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data may be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more software application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated software application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Generally, the present invention provides, a method to store self-descriptive, alphanumeric and binary data in a tabular data format, herein referred to as a "tabular data bundle" or "TDB." The term "self-descriptive" as used herein refers to the format's ability to store meta-information, i.e., information associated to the data). The present invention does not limit the use this meta-information and provides a framework for flexible use of the meta-information by a wide variety computer software applications and systems for data use. By storing data semantics in association with the data, instead of hard coding the data semantics in the software applications, a more flexible and maintainable programming environment occurs. This more flexible and maintainable programming environment also may handle different types of tabular data.

The present invention allows combining in a single XML or extensible markup language file both alphanumeric data values and data meta-information and to combine this XML file with binary data values stored as files in order to obtain a tabular data format archive file for sharing it between software applications residing on the same computer or between software application residing on many computers. The present invention permits combining alphanumeric and binary data in a single file and, after the combination occurs, to parse the resulting file for identifying when or where in the file are the binary portions and where are the alphanumeric portions.

In the present embodiment, the TDB core includes a file using an XML formatted instance definition referred to as a "tabular data modeling language" or "TDML." TDML allows storing alphanumeric data values and meta-information in an open tabular format. Binary data values are stored in individual files and the TDML file contains references to such binary values. The TDB archives or stores the TDML file together with the binary files. No restriction governs the format of the TDB archive. Depending on the software application, the TDB archive may be a Java archive (or jar file) or a compressed UNIX tape archive (tar) file. Parsing the TDML file allows data retrieval from the TDB archive. Randomly accessing binary data values by using the references which the TDML file stores. Since most archive formats offer this type of random access, retrieval from the TDB archive is possible.

Figure 2:
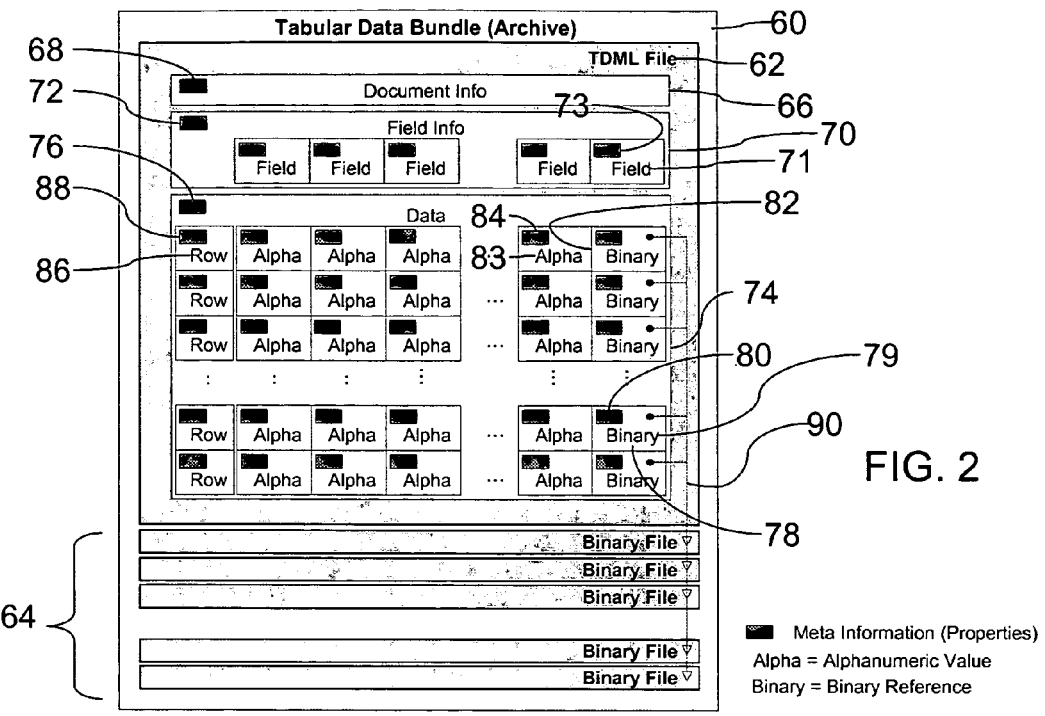
FIG. 2 is a block diagram illustrating the novel concepts of the tabular data bundle of the present invention.

FIG. 2 shows an exemplary layout of the TDB archive 60 as including a tabular data modeling language file or "TDML" file 62 which include distinctive parts. In FIG. 2, therefore, TDB archive 60 presents one open tabular format TDML file 62 containing the alphanumeric data values and the meta-information and containing binary files set 64, each representing one individual binary data value. Within TDML file 62 appear several different parts or logical XML elements groupings, including document information part 66, field information part 70, and data part 74. Document information part 66 contains document meta-information part 68 describing the whole TDB archive. Field information part 70 contains field meta-information part 72 and a field parts set 71, each containing a field meta-information part 73. Data part 74 contains data meta-information part 76 and a row parts set. Each row part 86 contains a row meta-information part 88 and an alphanumeric and binary data parts set, which may be in no particular order.

Each alphanumeric data part 82 contains an alphanumeric meta-information part 84 and an alphanumeric value 83. Each binary data part 78 contains a binary meta-information part 80 and a binary data reference part 79 that references a specific one, and only one, of binary files 64. Although the present embodiment uses TDML as an XML instance definition for TDB archive 60, other suitable languages, including other XML instance definitions, may provide essentially similar functionality.

Meta-information parts, including meta-information parts 68, 72, 73, 80, 84, and 88, for example, make possible the use of self-descriptive data. Self-descriptive data makes much more flexible and maintainable those software applications that need to interpret the data values. In particular, stored data values semantics information, as provided by the present invention, allow programs to be much more flexible at all possible levels. Meta-information, therefore, may exist for the entire collection, as well as row, column and cell data values, which results in a highly flexible use of the present invention's novel features. Meta-information parts also allow software applications to establish rules for data interpretation. Associating such meta-information with data provides software applications with the opportunity to interpret data according to these pre-established rules. For instance, a number of software applications may define a set of generic data types. These data types may be stored together with the data values and transferred between software applications, allowing them to perform validity checks and semantic interpretation of the data.

Figure 3:
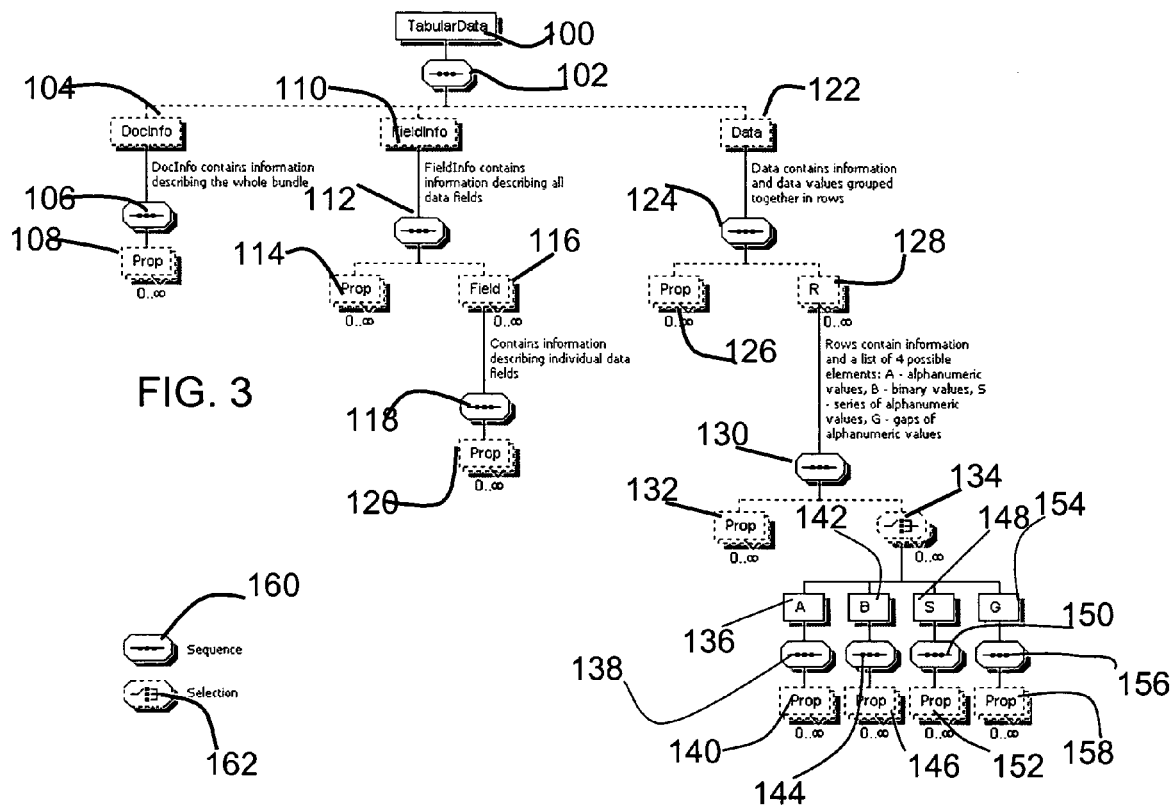
FIG. 3 illustrates a hierarchical view of forming the tabular data model language file of the tabular data bundle according to the teachings of the present invention.

FIG. 3 shows the hierarchical structure of the TDML file contained in the TDB archive 60. Each rectangular box represents an XML element. A sequence, as shown in 160, is an ordered set of the associated elements. A selection, as shown in 162, is an unordered choice of the associated elements.

For each TDML part in TDB archive 60 of FIG. 2 one or more corresponding XML elements appears in FIG. 3. Each meta-information part, such as document meta-information part 68 of FIG. 2, includes a series of any non-negative number of property elements (Prop tag) 108. The non-negative number of property elements or property elements representing meta-information depends on the particular use of TDB archive 60 and the environment in which it operates. Each property element preferably includes two mandatory string attributes: a name string attribute, which stores the name of the property and a val string attribute, which stores the value of the property. All XML elements in TDB archive 60, except for the root or tabular data element (TabularData tag) 100, are optional. For instance, a TDML file with no data may exist with only have the Tabular data element 100 root element.

In FIG. 3, Tabular data element 100 contains a sequence 102 of document information element (DocInfo tag) 104, field information element (FieldInfo tag) 110, and data element (Data tag) 122. Document information element 104 corresponds to document information part 66 and contains a sequence 106, which itself contains a non-negative number of property element 108, which corresponds to document information meta-information part 68.

Field information element 110 corresponds to field information part 70 and contains sequence 112, which includes a non-negative number of property elements 114, corresponding to field information meta-information part 72. Sequence 112 further contains a non-negative number of field elements (Field tags) 116, corresponding to field parts set 71. The non-negative number of field elements 116 depends on the particular use of the of the TDB archive. Each field element 116 contains a sequence 118 with a non-negative number of property elements 120, corresponding to the field meta-information part 73. Field elements 116 include two optional attributes of type string: a name attribute for storing a field name and a default attribute for storing a default data value for the field. The usage of these attributes is flexible according to the needs of different associated software applications.

Data element (Data tag) 122 corresponds to data part 74 and contains sequence 124, which includes a non-negative number of property elements 126, corresponding to data meta-information part 76. Sequence 124 further contains a non-negative number of row elements (R tags) 128 corresponding to row part 86. The non negative number of row elements 128 depends on the particular use of the TDB archive 60. Each row element 128 contains a sequence 130 with a non-negative number of property elements 132, corresponding to the row meta-information part 88. Sequence 130 further contains a selection 134.

Sequence 130 includes a non-negative number of elements containing various types of data values. Such data values may include, for example, alphanumeric elements (A tags) 136, binary reference elements (B tags) 142, series elements (S tags) 148 or gap elements (G tag) 154. Alphanumeric elements 136 contain exactly one alphanumeric data value and sequence 138, which includes a non-negative number of property elements 140. Binary reference elements 142 contain sequence 144, including a non-negative number of property elements 146. Binary reference elements 142 have a mandatory attribute ref of type string for storing the name or the path within the TDB archive 60 of the binary file containing the associated binary data value.

Series elements 148 contain collections of alphanumeric data values or binary references that are constituted of the same number of characters. Series element 148 collections are stored as character streams which contain the concatenated individual data values. Series elements 148 also contain a sequence 150 with a non-negative number of property elements 152. Series elements 148 have an optional attribute, s, with a non-negative integer type. The s attribute, having a default value '1" stores the number of characters of each data value and facilitates the retrieval of the individual values from an associated concatenated stream. Series elements 148 also have an optional attribute, b, having a Boolean type. The b attribute, having a default value of false indicates whether a series contains a concatenated stream of references to binary data values. If so, the b attribute has the value true. Similar to the value stored by the ref attribute of binary reference element 142, these reference strings contain the name or the path within TDB archive 60 of the binary files that store the binary data value. If the b attribute has the value false it indicates that the series contains a concatenated stream of alphanumeric data values. The contents of series elements may either be only alphanumeric values or only binary references, as indicated by the b attribute.

Gap elements 154 contain sequence 156 having a non-negative number of property elements 158. Gap elements 154 indicate a series with a positive number of "gaps," i.e., "empty" or "default" alphanumeric or binary data values. Gap elements 154 possess an optional attribute, s, having a non-negative integer type with a default value of "1", which stores the number of "gaps". Gap elements 154 also possess a second optional attribute, v, having a string type storing a default data value, and a third optional attribute, b, having a Boolean type with a default value of false. The b attribute, similar to the b attribute of series elements 148, indicates whether the "gap" represents a binary or alphanumeric data value.

Figure 4:
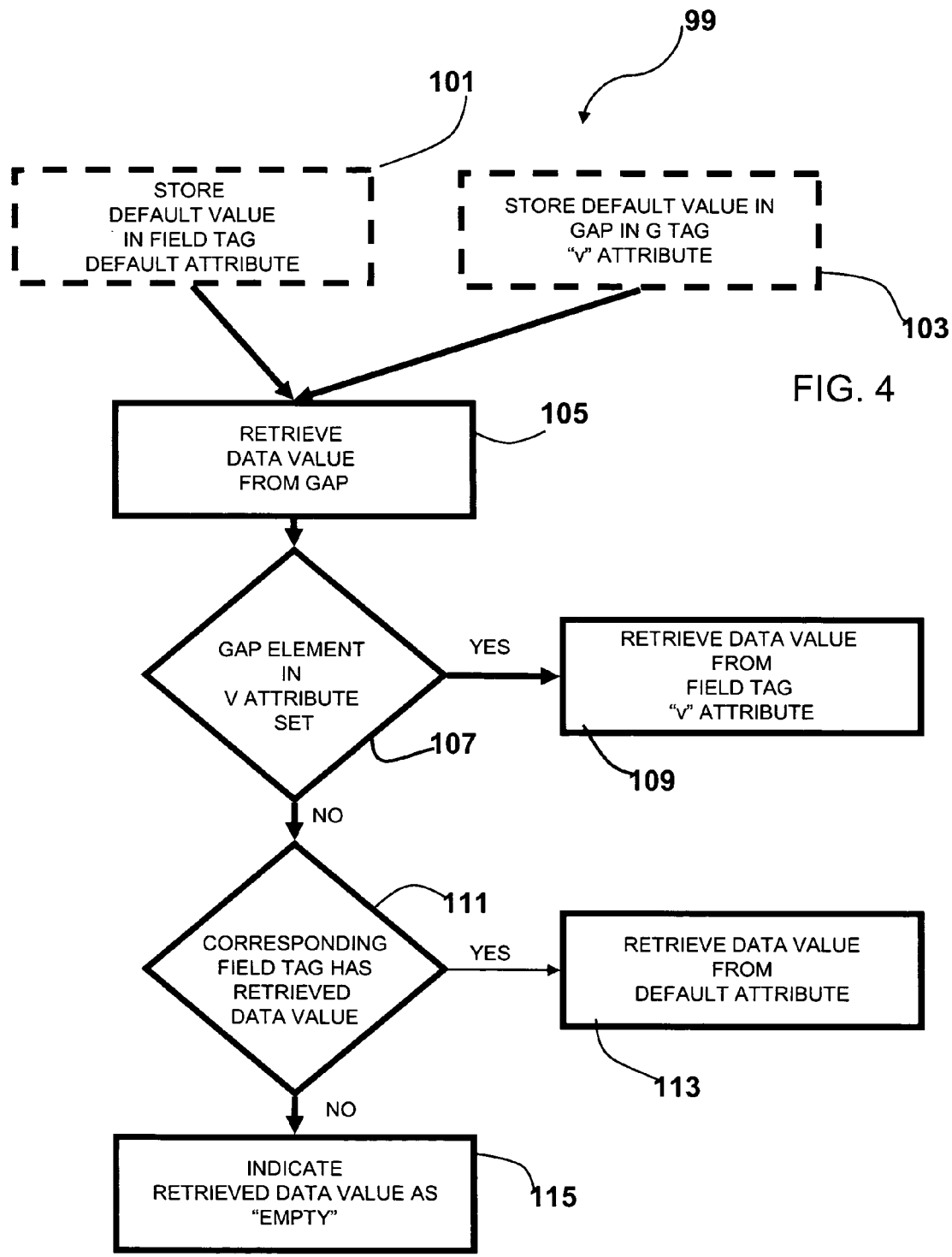
FIG. 4 depicts a process for retrieving stored data values that uses the teachings of the present invention.

Series elements 148 and gap elements 154, therefore, store multiple data values as an alternative to the alphanumeric elements 136 and binary reference elements 142, which store a single data value. This permits reducing the size of TDB archive 60 when tabular data includes, respectively, data repetitions/regularities or data gaps (such as in a sparse matrix). For example, a row may contain the consecutive alphanumeric values "2000," "2001," "2002," "2003," and "2004." Using alphanumeric elements 136 yields the string <A>2000</A><A>2001</A><A>2002</A><A>2003</A><A>2004</A>. With series elements 148, on the other hand, the string becomes, <S s="4">20002001200220032004</S>. FIG. 4, below, describes further the use of gap elements 154 together with a process for retrieving data values. The "open tabular format" nature of TDML resides in the use of meta-information, as well as specialized elements, such as series elements 148 and gap elements 154, for providing a rich set of features for the optimal and flexible use by a wide variety of software programs of the tabular data format combining both alphanumeric and binary data.

In relating FIG. 2 to FIG. 3, it should be considered that alphanumeric data parts 82 and binary reference data parts 78 need not have any unique correspondence to TDML elements. Alphanumeric data parts 82 may be represented by alphanumeric elements 136 or by values stored in series elements 148 or gap elements 154, if their b attribute is set to false. Binary reference data parts 78 may be represented by binary reference elements 142 or by values stored in series elements 148 or gap elements 154, if their b attribute is set to true. Thus, TDML file 62 provides the means to store alphanumeric data value, binary data value references and meta-information in the form of properties for both alphanumeric and binary data values.

In further understanding the method and system of the present invention, it should be noted that software applications may optionally interpret a data value indicated as "empty" or set the "default" for a data value. Also, the method for retrieving "empty" or "default" data values is up to the discretion of the using software application. However, the process 99 of FIG. 4 may make optimal use of the above-described attributes. At step 101, a software application may use the attribute default of field element 116 to store a default value for all data values in the column that appositionally corresponds to the field. Then, at step 103, a process may also use the v attribute of gap elements 154 to store a default value for all data values in the gap. A data value may be retrieved, as initiated at step 105, from the gap, using the following algorithm: if the gap element 154 has the v attribute set, as tested at step 107, then the data value retrieved, at step 109, is the value stored in the v attribute. Otherwise, if the v attribute is not set and the corresponding field element 116 has the default attribute set, as tested at step 111, then the retrieved data value is the value stored in the default attribute, at step 113. Otherwise, if neither the gap elements 154 v attribute is set nor the corresponding field element 116 default v attribute is set, the retrieved data value is indicated, at step 115, as "empty."

As an example, consider a row containing ten Boolean values, all of which are "true," as represented by the value "T." Using alphanumeric elements 136 would yield the sequence <A>T</A><A>T</A><A>T</A><A>T</A><A>T</A><A>T</A><A>T</A><A>T</A><A>T</A><A>T</A>. Using gap elements 154 and with the algorithm described in FIG. 4 yields the significantly shorter sequence <G s="10" v="T"/>. Clearly, the result is using significantly less space with no loss in precision to describe and use the associated data values.

Figure 5:
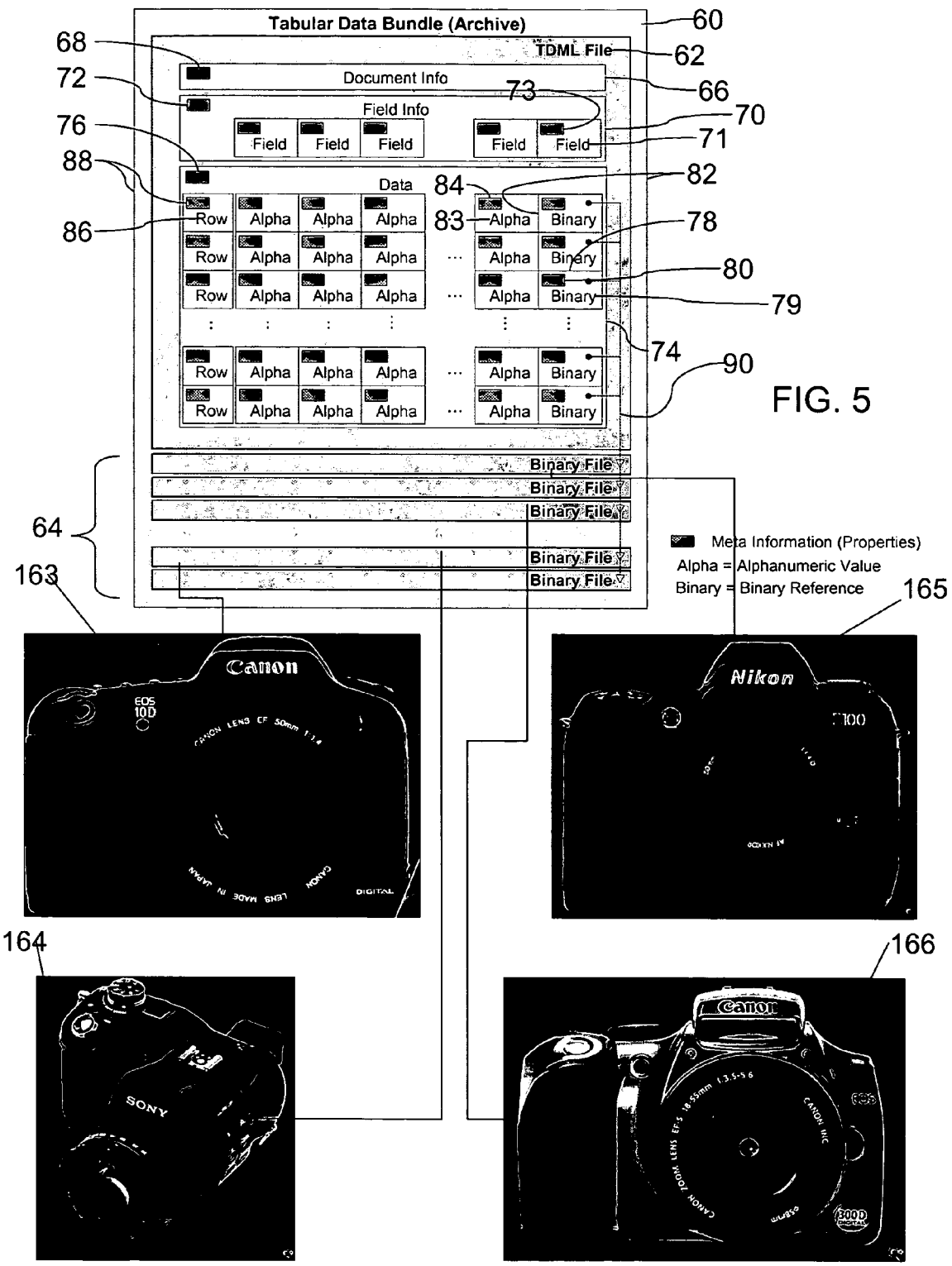
FIG. 5 provides in more detail the aspect of using a binary reference within the tabular data bundle for permitting the storing and retrieving of both alphanumeric and binary data within the tabular data bundle.

FIG. 5 more specifically elucidates the inventive aspect of the present embodiment for permitting the bundling of binary data files 64 within TDB 60. In particular, FIG. 5 conveys the concept that, through the values appearing in binary reference parts 78 of data part 74, TDML file 62 possesses references to binary data file 163, 164, 165, and 166. Such binary files may be, for example, JPEG files of specific images. In this specific instance, the binary files happen to be those of various camera images, although any number of different types of binary files may be included in the set of binary files 64 of TDB 60.

Figure 6:
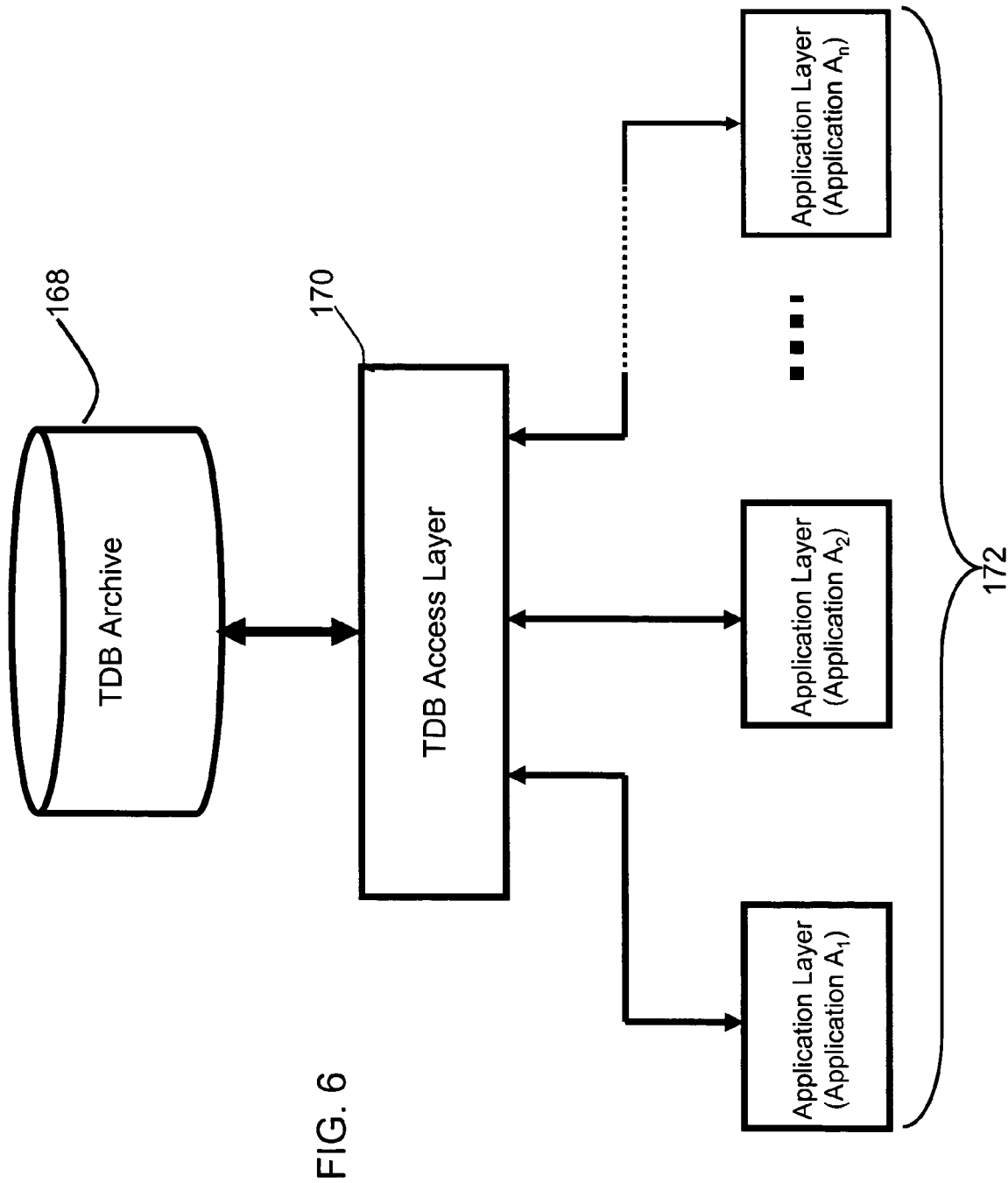
FIG. 6 illustrates the operation of the present invention showing a layered software organization for practicing the present invention, in which software applications access the tabular data bundle without requiring semantic rules for data interpretation.
Figure 7:
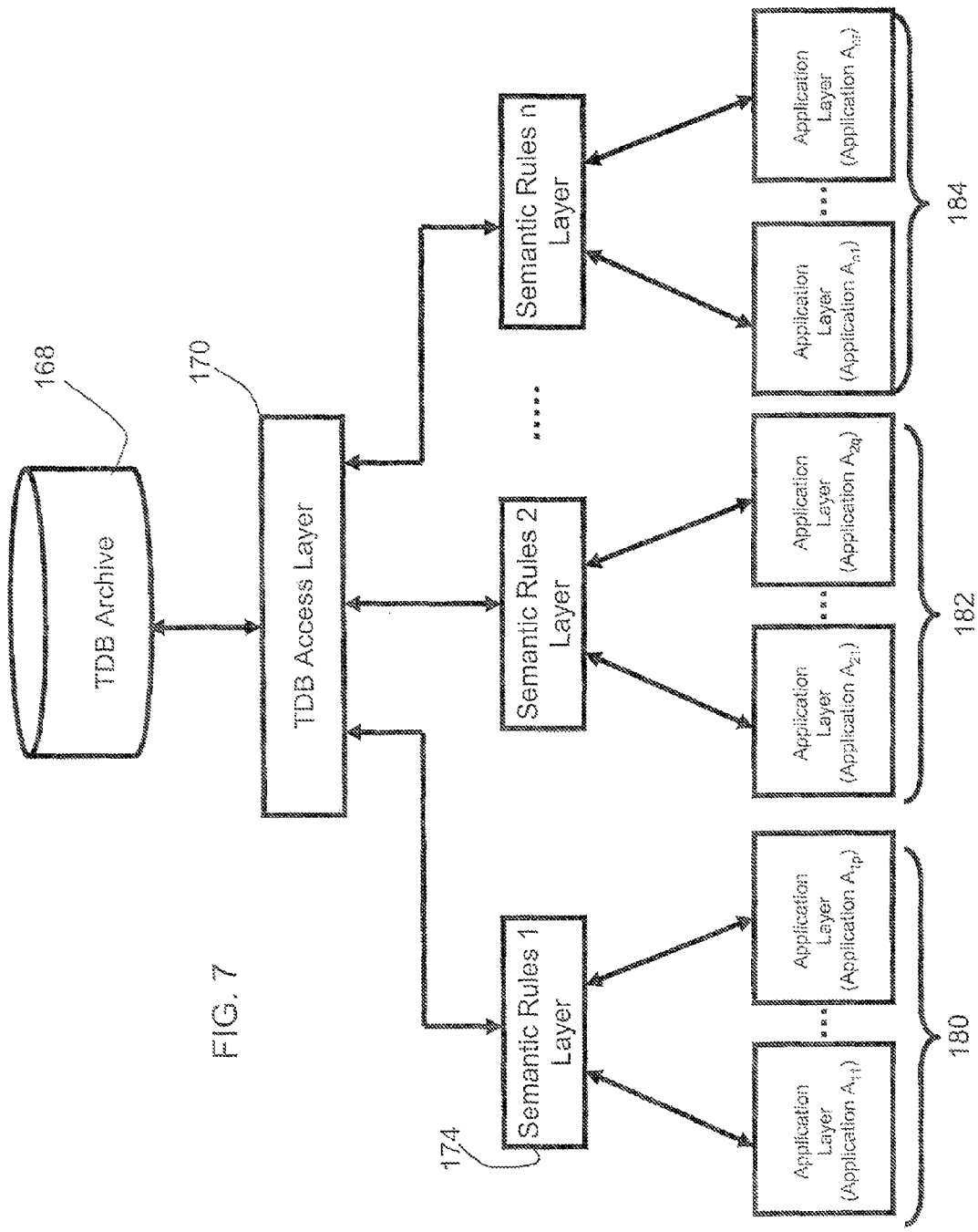
FIG. 7 illustrates the operation of the present invention showing a layered software organization for practicing the present invention, in which software applications access the tabular data bundle and perform required semantic rules for data interpretation.

FIG. 6 and FIG. 7 relate to the operation of two different layered software organizations for practicing the present invention. All layers, except the software application layer, may be implemented as software libraries or independent software modules which all software application would use. In both FIGUREs, the TDB Access Layer 170 implements the functionality necessary to create, read, and write data values and meta-information from and to the TDB archive 168. TDB Access Layer 170 permits accessing files within TDB archive 168, as well as parsing TDML file 62. This layer implements a raw data access in the sense that no semantic data interpretation occurs. FIG. 6 shows a set of software applications 172, which only require a more simple or basic access. By contrast, FIG. 7 shows different sets of software applications 180, 182 and 184 that may require semantic rules for data interpretation. In such an operation, each software applications set shares the same semantic rules implemented as another software layer on top of the TDB Access Layer 170. For instance, the software applications set 180 uses the Semantic Rules 1 Layer 174, which uses the TDB Access Layer 170 to access the TDB archive 168.

One example within the automotive industry may be a comprehensive set of data types and their associated validation. In such an example, handling rules using TDB archives 168 may be created and adopted industry-wide as a standard for vehicle related information. A software library offering a clear interface to vehicle data and its semantic rules may be created allowing independent software applications to share this kind of data. The present invention facilitates the translation of data from a first software application that may reside on a remote computer to another software application that resides on a host computer.

The present invention uses XML as the base language for TDML file 62. XML provides a simple, widely-accepted, consistent well-defined format that facilitates parsing instructions incorporation into both new and existing programs. The "human-readable" XML language also allows a developer (or frequently even a business analyst) to examine an XML stream and know that the stream is correct or, conversely, identify errors. At the same time, an XML script still conforms to a known structure. XML provides a grammar for parsing a particular file or stream format. The XML grammar covers basic syntax, the most important being that of element tags and attribute specifications. XML schemas permit specifying more extensive grammar constraints, as well as guiding the layout of an XML document to make the XML document much more predictable. A programmer may examine an XML schema and know exactly what corresponding XML documents look like. Additionally, a program may reject an XML document out of hand when the XML does not conform to the appropriate XML schema.

An XML schema specifies valid elements and attributes in an XML instance. Furthermore, an XML schema specifies the exact element hierarchy for nested elements, as well as options, such as limits on the number of occurrences of a type of element, and various other constraints placed on the XML instance. In addition, a schema specifies a range for the value of an element or attribute (the text between the start-tags and end-tags value), i.e., the text between the quotes. The following TABLE 1, therefore, provides an XML schema which embodies the structural concepts in TDML file 62 that may appear in TDB archive 60. Note, however, that there may be many other ways to employ the rules, structures, and concepts of the present invention.

TABLE 1

XML Schema for The TDML File

```
<?XML version="1.0" encoding="UTF-8"?>
<xs:schema XMLns:xs="http://www.w3.org/2001/XMLSchema"
elementFormDefault="qualified">
    <xs:element name="TabularData">
        <xs:complexType>
            <xs:sequence>
                <xs:element ref="DocInfo" minOccurs="0"/>
                <xs:element ref="FieldInfo" minOccurs="0"/>
                <xs:element ref="Data" minOccurs="0"/>
            </xs:sequence>
        </xs:complexType>
    </xs:element>
    <xs:element name="DocInfo">
        <xs:annotation>
            <xs:documentation XML:lang="en">DocInfo contains information
describing the whole bundle</xs:documentation>
        </xs:annotation>
        <xs:complexType>
            <xs:sequence>
                <xs:element ref="Prop" minOccurs="0" maxOccurs=
"unbounded"/>
            </xs:sequence>
        </xs:complexType>
    </xs:element>
    <xs:element name="FieldInfo">
        <xs:annotation>
            <xs:documentation>FieldInfo contains information describing
all data fields</xs:documentation>
        </xs:annotation>
        <xs:complexType>
            <xs:sequence>
                <xs:element ref="Prop" minOccurs="0" maxOccurs=
"unbounded"/>
                <xs:element ref="Field" minOccurs="0" maxOccurs=
"unbounded"/>
            </xs:sequence>
        </xs:complexType>
    </xs:element>
    <xs:element name="Data">
        <xs:annotation>
            <xs:documentation>Data contains information and data values
grouped together in rows</xs:documentation>
        </xs:annotation>
        <xs:complexType>
            <xs:sequence>
                <xs:element ref="Prop" minOccurs="0" maxOccurs=
"unbounded"/>
                <xs:element ref="R" minOccurs="0" maxOccurs=
"unbounded"/>
            </xs:sequence>
        </xs:complexType>
    </xs:element>
    <xs:element name="Field">
        <xs:annotation>
            <xs:documentation>Contains information describing individual
data fields</xs:documentation>
        </xs:annotation>
        <xs:complexType>
            <xs:sequence>
                <xs:element ref="Prop" minOccurs="0" maxOccurs=
"unbounded"/>
            </xs:sequence>
            <xs:attribute name="name" type="xs:string" use="optional"/>
            <xs:attribute name="default" type="xs:string" use="optional"/>
        </xs:complexType>
    </xs:element>
    <xs:element name="R">
        <xs:annotation>
```

TABLE 1-continued

XML Schema for The TDML File

```
            <xs:documentation>Rows contain information and a list of 4
possible elements: A - alphanumeric values, b - binary values, s - series of
alphanumeric values, G - gaps of alphanumeric values
</xs:documentation>
        </xs:annotation>
        <xs:complexType>
            <xs:sequence>
                <xs:element ref="Prop" minOccurs="0" maxOccurs=
"unbounded"/>
                <xs:choice minOccurs="0" maxOccurs="unbounded">
                    <xs:element ref="A"/>
                    <xs:element ref="B"/>
                    <xs:element ref="S"/>
                    <xs:element ref="G"/>
                </xs:choice>
            </xs:sequence>
        </xs:complexType>
    </xs:element>
    <xs:element name="Prop">
        <xs:complexType>
            <xs:attribute name="name" type="xs:string" use="required"/>
            <xs:attribute name="val" type="xs:string" use="required"/>
        </xs:complexType>
    </xs:element>
    <xs:element name="A">
        <xs:complexType mixed="true">
            <xs:sequence>
                <xs:element ref="Prop" minOccurs="0" maxOccurs=
"unbounded"/>
            </xs:sequence>
        </xs:complexType>
    </xs:element>
    <xs:element name="B">
        <xs:complexType>
            <xs:sequence>
                <xs:element ref="Prop" minOccurs="0" maxOccurs=
"unbounded"/>
            </xs:sequence>
            <xs:attribute name="ref" type="xs:string" use="required"/>
        </xs:complexType>
    </xs:element>
    <xs:element name="S">
        <xs:complexType mixed="true">
            <xs:sequence>
                <xs:element ref="Prop" minOccurs="0" maxOccurs=
"unbounded"/>
            </xs:sequence>
            <xs:attribute name="s" type="xs:nonNegativeInteger" use=
"optional" default="1"/>
            <xs:attribute name="b" type="xs:boolean" use="optional"
default="false"/>
        </xs:complexType>
    </xs:element>
    <xs:element name="G">
        <xs:complexType>
            <xs:sequence>
                <xs:element ref="Prop" minOccurs="0" maxOccurs=
"unbounded"/>
            </xs:sequence>
            <xs:attribute name="s" type="xs:nonNegativeInteger" use=
"optional" default="1"/>
            <xs:attribute name="v" type="xs:string" use="optional"/>
            <xs:attribute name="b" type="xs:boolean" use="optional"
default="false"/>
        </xs:complexType>
    </xs:element>
</xs:schema>
```

Now, taking into consideration the rules exhibited in the XML schema of TABLE 1, the following TABLE 2 provides a more particular example of a TDML file for implementing the TDB archive 60 of FIG. 5, which demonstrated the bundling of binary files 163, 164, 165, and 166, which in this example constitute various digital photographs of hand-held cameras.

TABLE 2

TDML file for FIGURE 4 TDB archive 60

```
<?XML version="1.0" encoding="ISO-8859-1" ?>
<TabularData XMLns:xs="http://www.w3.org/2001/XMLSchema-
instance" xs:noNamespaceSchemaLocation="TDML.xsd">
<DocInfo>
    <Prop name="Application" val="Digital Camera Viewer"/>
    <Prop name="Country" val="US" />
</DocInfo>
<FieldInfo>
    <Field name="Make">
        <Prop name="Possible Values" val="Canon, FujiFilm, Kodak,
Nikon, Olympus, Sony" />
        <Prop name="Field Description" val="Camera Make" />
    </Field>
    <Field name="Model">
        <Prop name="Type" val="alphanumeric" />
        <Prop name="Max Length" val="16" />
        <Prop name="Field Description" val="Camera Model" />
    </Field>
    <Field name="Resolution">
        <Prop name="Type" val="numeric" />
        <Prop name="Max Length" val="10" />
        <Prop name="Field Description" val="Camera Resolution in
        MegaPixels" />
    </Field>
    <Field name="Camera Type">
        <Prop name="Possible Values" val="Automatic, Prosumer, SLR" />
        <Prop name="Field Description" val="Camera Type" />
    </Field>
    <Field name="Color" default="black">
        <Prop name="Possible Values" val="black, silver" />
        <Prop name="Field Description" val="Camera Color" />
    </Field>
    <Field name="Camera Image">
        <Prop name="Type" val="binary file" />
        <Prop name="Open With" val="Photoshop.exe" />
        <Prop name="Field Description" val="Image file showing the
Camera. Must be present in the Data Bundle Archive" />
    </Field>
    <Field name="Sharpening">
        <Prop name="Possible Values" val="Y, N" />
        <Prop name="Field Description" val="In-camera sharpening
        supported?" />
    </Field>
    <Field name="Saturation">
        <Prop name="Possible Values" val="Y, N" />
        <Prop name="Field Description" val="In-camera color saturation
supported?" />
    </Field>
    <Field name="Hue">
        <Prop name="Possible Values" val="Y, N" />
        <Prop name="Field Description" val="In-camera hue modification
supported?" />
    </Field>
    <Field name="List Price">
        <Prop name="Type" val="numeric" />
        <Prop name="Currency" val="US$" />
        <Prop name="Field Description" val="Camera Price" />
    </Field>
</FieldInfo>
<Data>
    <R>
        <A>Canon</A>
        <A>10D</A>
        <A>6.3</A>
        <A>SLR</A>
        <G s="1" />
        <!--This is a Gap of size 1 (one value): the default field value will be
used which is "black"-->
        <B ref="Canon_10D.jpg"/>
        <S s="1">YYY</S>
<!--This is a series of 3 consecutive values with the same size of 1
character-->
        <A>1999.0</A>
    </R>
    <R>
        <A>Canon</A>
        <A>EOS 300D</A>
```

TABLE 2-continued

TDML file for FIGURE 4 TDB archive 60

```
        <A>6.3</A>
        <A>SLR</A>
        <A>silver</A>
        <B ref="Canon_EOS 300D.jpg" />
        <S s="1">YNY</S>
<!--This is a series of 3 consecutive values with the same size of 1
character-->
        <A>899.0</A>
    </R>
    <R>
        <A>Nikon</A>
        <A>D100</A>
        <A>6.1</A>
        <A>SLR</A>
        <G s="1" />
        <!--This is a Gap of size 1 (one value): the default field value will be
used which is "black"-->
        <B ref="Nikon_D100.jpg" />
        <S s="1">YYY</S>
<!--This is a series of 3 consecutive values with the same size of 1
character-->
        <A>899.0</A>
    </R>
    <R>
        <A>Sony</A>
        <A>DSC-F828</A>
        <A>8.0</A>
        <A>Prosumer</A>
        <G s="1" />
<!--This is a Gap of size 1 (one value): the default field value will be used
which is "black"-->
        <B ref="Sony_DSC-F828.jpg" />
        <S s="1">YYY</S>
<!--This is a series of 3 consecutive values with the same size of 1
character-->
        <A>999.0</A>
    </R>
</Data>
</TabularData>
```

Using the XML language, the above TDML file 62, binary image files 163, 164, 165, and 166, as well as other concepts of the present invention, there is provided the ability to bundle and in a single tabular data form the contents of a TDB archive 60. The present invention, therefore, provides the ability to bundle both alphanumeric and binary data in a single format that is usable by many different software applications in a wide variety of differing computing environments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for storing and retrieving self-descriptive tabular data with alphanumeric and binary values, comprising the steps of:

storing, in a memory of a computer, binary values in a plurality of individual binary files;

generating, for storage in the memory of the computer and in an open tabular format, a file comprising:

a plurality of alphanumeric data values;

meta-information associated with the alphanumeric data values and describing a predetermined set of characteristics of said open tabular format and the alphanumeric data values, the open tabular format includes series data values and associated series meta-information for describing alphanumeric and binary reference data values appearing repetitively in the open tabular format, the open tabular format is formed with gap data values and associated gap meta-information for describing gaps in alphanumeric and binary reference data values appearing in the open tabular format; and a plurality of references, with each reference corresponding to one of the individual binary files; and parsing the generated file to identify locations of the alphanumeric data values and the plurality of references and to allow subsequent selective retrieval of each alphanumeric data value and each reference to an individual binary file.

2. The method of claim 1, further comprising expressing the open tabular format as a markup language file.

3. The method of claim 1, further comprising associating with said alphanumeric data values and said binary reference values a set of row values and associated row meta-information.

4. The method of claim 1, further comprising the steps of forming said open tabular format to comprise document information values and associated document meta-information and field information values and associated field meta-information.

5. A system for storing and retrieving self-descriptive tabular data with alphanumeric and binary values, comprising:
a memory storing instructions;
a processor for executing one or more of the instructions, the instructions comprising:
instructions for storing binary values in a plurality of individual binary files;
instructions for generating, in an open tabular format, a file comprising:
a plurality of alphanumeric data values;
meta-information associated with the alphanumeric data values and describing a predetermined set of characteristics of said open tabular format and the alphanumeric data values, the open tabular format includes series data values and associated series meta-information for describing alphanumeric and binary reference data values appearing repetitively in the open tabular format, the open tabular format is formed with gap data values and associated gap meta-information for describing gaps in alphanumeric and binary reference data values appearing in the open tabular format; and
a plurality of references, with each reference corresponding to one of the individual binary files; and
instructions for parsing the generated file to identify locations of the alphanumeric data values and the plurality of references and to allow subsequent selective retrieval of each alphanumeric data value and each reference to an individual binary file.

6. The system of claim 5, further comprising instructions for expressing said open tabular format as a markup language file.

7. The system of claim 5, further comprising instructions for associating with said alphanumeric data values and said binary reference values a set of row values and associated row meta-information.

8. The system of claim 5, further comprising instructions for forming said open tabular format to comprise document information values and associated document meta-information and field information values and associated field meta-information.

9. An article comprising a computer-readable medium storing instructions for storing and retrieving self-descriptive tabular data with alphanumeric and binary values, the instructions operable to cause one or more data apparatus to perform operations comprising:
storing binary values in a plurality of individual binary files;
generating, in an open tabular format, a file comprising:
a plurality of alphanumeric data values;
meta-information associated with the alphanumeric data values and describing a predetermined set of characteristics of said open tabular format and the alphanumeric data values, the open tabular format includes series data values and associated series meta-information for describing alphanumeric and binary reference data values appearing repetitively in the open tabular format, the open tabular format is formed with gap data values and associated gap meta-information for describing gaps in alphanumeric and binary reference data values appearing in the open tabular format; and
a plurality of references, with each reference corresponding to one of the individual binary files; and
parsing the generated file to identify locations of the alphanumeric data values and the plurality of references and to allow subsequent selective retrieval of each alphanumeric data value and each reference to an individual binary file.

10. The article medium of claim 9, further comprising instructions for expressing said open tabular format as a markup language file.

11. The article medium of claim 9, further comprising instructions for associating with said alphanumeric data values and said binary reference values a set of row values and associated row meta-information.

12. The article medium of claim 9, further comprising instructions for forming said open tabular format to comprise document information values and associated document meta-information and field information values and associated field meta-information.

13. The method of claim 1 further comprising selectively retrieving at least one of a portion of the alphanumeric data values or an individual binary file from the parsed file.

14. The method of claim 1 wherein an individual binary file consists of one binary value.

* * * * *

UNITED STATES PATENT AND TRADEMARK OFFICE
CERTIFICATE OF CORRECTION

PATENT NO. : 7,664,759 B2
APPLICATION NO. : 10/847759
DATED : February 16, 2010
INVENTOR(S) : Maxim A. Alexandrescu Page 1 of 1

It is certified that error appears in the above-identified patent and that said Letters Patent is hereby corrected as shown below:

In column 8, line 38, delete "'1'" and insert -- of "1" --, therefor.

Signed and Sealed this

Eighteenth Day of May, 2010

David J. Kappos
*Director of the United States Patent and Trademark Office*